Patented July 29, 1941

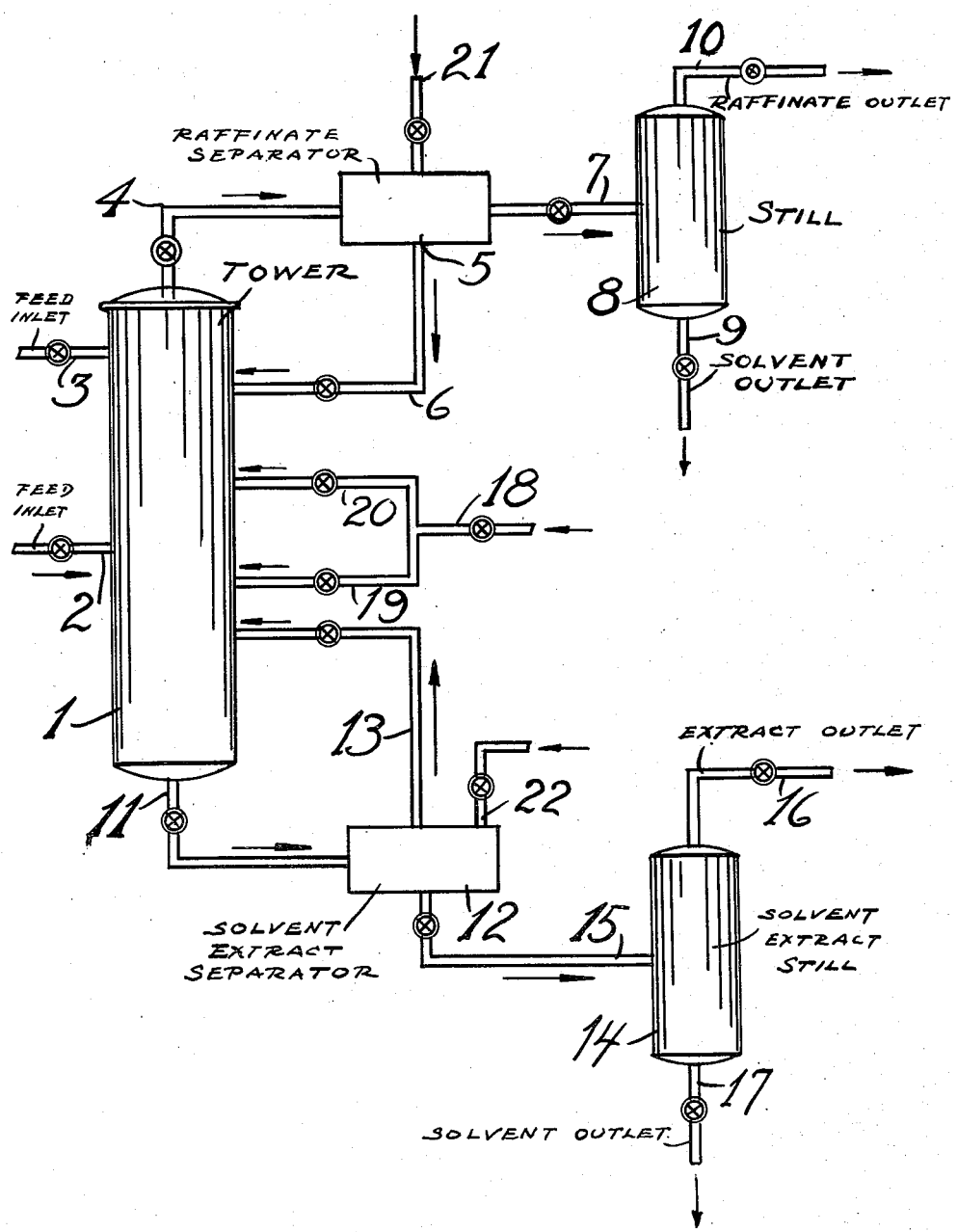

2,250,579

UNITED STATES PATENT OFFICE 2,250,579

SOLVENT EXTRACTION PROCESS

Bruce G. Gillespie, Cranford, N. J., assignor to Standard Oil Development Company, a corporation of Delaware Application September 14, 1939, Serial No. 294,798

5 Claims. (Cl. 196—13)

The present invention relates to the solvent treatment of mineral oils and is especially concerned with the treatment of petroleum oils with a particular class of selective solvents. In accordance with the present invention, petroleum oils, particularly petroleum oils boiling in the range below about 420° F., are segregated into their relatively more aromatic fractions and into their relatively more paraffinic fractions by means of solvents selected from the class of nitro alcohols which are characterized by having a hydroxyl group and a nitro group on adjacent carbon atoms and are further characterized by having an aromatic or olefinic group attached to one of said carbon atoms.

It is well known in the art to treat mineral oils, particularly petroleum oils, with various selective solvents which have the ability to segregate the relatively more aromatic fractions from the relatively more paraffinic fractions. In processes of this character, the oil and solvent are suitably contacted by various processes, as for example, by a single batch process or by a multi batch process. In general, the preferred process, however, is a countercurrent tower treating operation in which the lighter phase, usually the oil, is introduced into the center or bottom section of a countercurrent treating tower. The oil flows upwardly through the tower and contacts downflowing solvent which is introduced into the upper section of the tower. Efficient contact between the countercurrently flowing phases is secured by suitable means, as for example, by contact masses, distributing plates, pierced plates, and the like.

The conditions of operation are adjusted to optimum values to secure desirable results and depend upon various factors, as for example, upon the particular solvent or solvent mixture being used, the oil being treated, and the yield and quality of the products desired. These processes are usually employed in the solvent treatment of petroleum oils in order to improve their quality and in order to segregate particularly desirable fractions. In treating these oils, solvents of the class which have a preferential selectivity for the more aromatic type compounds as compared to the more paraffinic type compounds are usually employed. Solvents of this class are, for example, phenol, furfural, sulfur dioxide, cresol, nitro benzene, aniline, beta beta dichlor diethyl ether, and the like. Mixtures of these solvents are also utilized, as well as substances of the class of liquefied normally gaseous hydrocarbons. Solvent modifying agents having the ability to modify the selectivity and solvent power of the selective solvent of the type of water, glycols, and alcohols are also employed. These latter materials may be added to the respective phases after separation or may be introduced into the countercurrent treating system at a plurality of points.

I have now discovered a class of solvents which are particularly desirable in the treatment of petroleum oils, especially for the treatment of those petroleum oils boiling below about 420° F. The solvents of my invention are selected from the class of nitro alcohols which may be represented by the following structural formula:

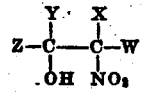

in which at least one of W, X, Y, and Z represents an aromatic or olefinic radical. Solvents of this class are, for example, alphahydroxy-beta-nitro-isobutylbenzene, produced by reacting benzaldehyde with 2-nitro propane; 4-hydroxy-5-nitro-hexene-2, produced by reacting crotonaldehyde with nitroethane; phenyl nitromethyl carbinol; nitro benzhydryl carbinol; 1-styryl-1-hydroxy-2-nitro-2-methylpropane; 3-hydroxy-4-nitro-4-phenylpentene-1; alphahydroxy-beta-nitro-beta-phenyl-n-propylbenzene; 4-nitro-4-methyl-5-hydroxyhexene-2; and 2-nitro-2-phenyl-3-hydroxybutane.

One modification of my invention may be seen by reference to the attached drawing. For purposes of illustration it is assumed that a heavy naphtha boiling in the range from about 250° F. to 400° F. is being solvent treated with alpha-hydroxy-beta-nitro-isobutylbenzene. Tower 1 represents a countercurrent solvent treating tower containing suitable distributing and contacting means. The heavy naphtha is introduced into tower 1 by means of feed line 2. The heavy naphtha flows upwardly through tower 1 and contacts downflowing solvent which is introduced into tower 1 by means of feed line 3. Temperature and pressure conditions are maintained on tower 1 in order to secure the formation of a raffinate phase and a solvent extract phase. The raffinate phase is withdrawn from tower 1 by means of line 4 and treated in a manner to separate the solvent from the oil. If desired, a partial phase separation may be secured in raffinate separator 5 and the precipitated solvent returned to tower 1 by means of line 6. The raffinate is removed from solvent separator 5 by means of line 7 and introduced into raffinate still 8 in which the final traces of raffinate are removed from the solvent. The solvent is removed from still 8 by means of line 9, while the solvent-free raffinate is removed by means of line 10. In case the treated stock is heavier than the solvent, the solvent, of course, would be taken overhead through the line 10, and the solvent free raffinate would be removed as bottoms through line 9. The solvent extract is withdrawn from tower 1 by means of line 11 and also handled in a manner to separate the oil from the solvent. If desired, a partial phase separation may be secured in solvent extract separator 12 and the precipitated oil returned to tower 1 by means of line 13. The solvent extract is withdrawn from solvent separator 12 and introduced into solvent extract still 14 by means of line 15. The solvent-free extract is removed overhead from solvent extract still 14 by means of line 16, while the solvent is removed by means of line 17. The selectivity and solvent power of the solvent may be modified by the introduction of solvent modifying agents by means of lines 18, 19, and 20. Phase separation in the raffinate separator 5 and in the solvent extract separator 12 may be facilitated by the introduction of a precipitant by means of lines 21 and 22 respectively, by cooling, or by other equivalent means.

The process of the present invention may vary widely. Although any solvent having the structural formula as given in which at least one of W, X, Y, and Z represents an aromatic or olefinic radical may be used, preferred results are secured when at least one phenyl group is attached to a carbon atom to which the hydroxyl or nitro group is attached. Preferred solvents are thus nitro alcohols characterized by having the hydroxyl group and the nitro group attached to adjacent carbon atoms and which are further characterized by having at least one aromatic group, particularly at least one phenyl group, attached to the carbon atom to which the hydroxyl or nitro group is attached. Thus the preferred solvents are for example, solvents of the types of alpha-hydroxy-beta-nitro-isobutylbenzene, phenyl nitromethyl carbinol, nitro-benzhydryl carbinol, alpha hydroxy-beta-nitro-beta-phenyl-n-propylbenzene, and 2-nitro-2-phenyl-3-hydroxybutane.

The volume of solvent used per volume of oil being treated will depend upon the particular solvent being used, as well as upon the feed oil being solvent treated and also upon the yield and quality of products desired. In general it is preferred to use from one-half to four volumes of solvent per volume of oil being treated. The temperature and pressure conditions are likewise adjusted to secure optimum results and depend, in general, upon the above enumerated factors. It is preferred to use atmospheric pressure or a pressure sufficient to prevent undue vaporization of the feed oil being treated and to employ a temperature below the complete miscibility temperature of the oil and the solvent. The temperature necessarily must be above the crystallization temperature of the normally solid solvent. For example, when using alphahydroxy-beta-nitro-isobutylbenzene, the temperature is preferably in the range from about 60° F. to 120° F. depending upon the feed oil being treated. Although the solvents of the present invention may be utilized in the relatively pure state, their selectivity and solvent power may be modified by the addition of solvent modifying agents.

In order to illustrate the invention, the following example is given which should not be construed as limiting the same in any manner whatsoever:

EXAMPLE

A heavy naphtha boiling in the range from about 225° F. to 410° F. and containing about 30% by volume of aromatics was treated with various selective solvents of the present invention. The results of these operations which were carried out in single batch extraction operation were as follows:

TABLE

*Naphtha extractions with nitroalcohol solvents of the type $WXCNO_2COHYZ$*

| Name of solvent | Phenylnitromethyl carbinol | Alphahydroxy-beta-nitro isobutyl-benzene | Nitrobenzhydryl carbinol |
| --- | --- | --- | --- |
| Group represented by letter of general formula: | | | |
| W | Hydrogen | Methyl | Phenyl. |
| X | do | do | Do. |
| Y | do | Hydrogen | Hydrogen. |
| Z | Phenyl | Phenyl | Do. |
| Solvent treat on naphtha containing 30 vol. percent of aromatics, vol. percent on feed | 100 | 100 | 100. |
| Temperature of extraction, °F | 100 | 100 | 100. |
| Extract yield, vol. percent on feed | 15.0 | 18.5 | 14.0. |
| Raffinate yield, vol. percent on feed | 85.0 | 81.5 | 86.0. |
| Concentration of aromatics in extract, vol. percent on extract | 85.5 | 80.4 | 85.3. |

From the above data it is apparent that relatively high yields of substantially pure aromatic fractions may be secured when utilizing the solvents of the present invention. It will be noted that the high concentration of aromatics attained in the extracts indicates unusually good selectivity for the solvents. Since the extract yield is relatively high for a single batch treat, only a small number of countercurrent stages will be adequate to remove substantially all of the aromatics from the feed. The extracts thus obtained will possess a higher concentration of aromatics than was attained by batch operation, and the yields will be correspondingly increased.

Extracts approaching 99-100% aromatics concentration for use as high octane blending agents, high solvency naphthas, chemical raw materials, and the like may be easily obtained by the use of the solvents herein disclosed in conjunction with a light paraffinic hydrocarbon such as propane or butane. These may be prepared by re-extracting the primary extracts obtained as above together with about 80-100% (on extract) of the light paraffinic hydrocarbon with one of the solvents of my invention. The secondary extract phase thus obtained, after removal of the light paraffinic hydrocarbon and the solvent, consists of practically pure aromatics.

The present invention is not to be limited by any theory or mode of operation, but only in and by the following claims in which it is desired to claim all novelty in so far as the prior art permits.

I claim:

1. Process for the segregation of petroleum oils into their relatively more aromatic and into their relatively more paraffinic constituents comprising contacting said petroleum oils with a solvent, selected from the class of solvents which are characterized by the following structural formula:

$$Z-\underset{\underset{OH}{|}}{\overset{\overset{Y}{|}}{C}}-\underset{\underset{NO_2}{|}}{\overset{\overset{X}{|}}{C}}-W$$

wherein at least one of the members W, X, Y, and Z is an aromatic group, and the remaining members are selected from the class consisting of hydrogen and hydrocarbon groups, under conditions to form a solvent extract phase and a raffinate phase, separating the respective phases and recovering the solvent therefrom.

2. Process for the segregation of petroleum oils boiling in the range below about 420° F. into their relatively more aromatic and into their relatively more paraffinic fractions comprising contacting said petroleum oils with a solvent, selected from the class of nitro alcohols which are characterized by having the following structural formula:

$$Z-\underset{\underset{OH}{|}}{\overset{\overset{Y}{|}}{C}}-\underset{\underset{NO_2}{|}}{\overset{\overset{X}{|}}{C}}-W$$

wherein at least one of the members W, X, Y, and Z is a phenyl group, and the remaining members are selected from the class consisting of hydrogen and hydrocarbon groups, under conditions to form a solvent extract phase and a raffinate phase, separating the respective phases and recovering the solvent therefrom.

3. Process in accordance with claim 2 in which said solvent is phenylnitromethyl carbinol.

4. Process in accordance with claim 2 in which said solvent is alphahydroxy-beta-nitro-isobutyl-benzene.

5. Process in accordance with claim 2 in which said solvent is nitro-benzhydryl carbinol.

BRUCE G. GILLESPIE.